United States Patent
Räsänen (10) Patent No.: US 6,201,976 B1
(45) Date of Patent: Mar. 13, 2001

(54) METHOD AND APPARATUS FOR ENABLING DATA TRANSMISSION BETWEEN A MOBILE NETWORK AND A FIXED NETWORK HAVING DIFFERENT DATA RATES

(75) Inventor: Juha Räsänen, Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/101,217

(22) PCT Filed: Jan. 7, 1997

(86) PCT No.: PCT/FI97/00003

§ 371 Date: Jul. 2, 1998

§ 102(e) Date: Jul. 2, 1998

(87) PCT Pub. No.: WO97/25824

PCT Pub. Date: Jul. 17, 1997

(30) Foreign Application Priority Data

Jan. 8, 1996 (FI) .......................................................... 960090

(51) Int. Cl.[7] .................................................. H04Q 7/20
(52) U.S. Cl. .......................... 455/557; 453/103; 370/209
(58) Field of Search .................................... 455/517, 507, 455/103, 107, 109, 557; 370/209, 342, 433

(56) References Cited

U.S. PATENT DOCUMENTS

| | | |
|---|---|---|
| 5,440,542 | 8/1995 | Procter et al. . |
| 5,491,565 | * 2/1996 | Naper ................................... 379/100 |
| 5,537,458 | * 7/1996 | Suomi et al. .......................... 379/59 |
| 5,793,744 | * 8/1998 | Kanerva et al. ...................... 370/209 |

FOREIGN PATENT DOCUMENTS

| | | | |
|---|---|---|---|
| 0 651 531 | 5/1995 | (EP) . | |
| 0668669 | * 8/1995 | (EP) .............................. | H04B/7/26 |
| WO 94/05104 | * 3/1994 | (WO) ............................ | H04L/25/49 |
| WO 95/15644 | * 6/1995 | (WO) ............................ | H04N/7/22 |
| WO 97/12490 | * 4/1997 | (WO) ............................ | H04Q/7/24 |

OTHER PUBLICATIONS

1992 Mouly and Pautet, *The GSM System for Mobile Communications* A copy of the International Search Report for PCT/FI97/00003.

* cited by examiner

Primary Examiner—Edward F. Urban
Assistant Examiner—Tilahun Gesesse
(74) *Attorney, Agent, or Firm*—Altera Law Group, LLC (57) ABSTRACT

The invention relates to an interworking function and a data transmission method in a mobile network comprising transparent data services employing different rates and bearer services. The interworking function (IWF) is connected, in an end-to-end data connexion, between a transparent traffic channel leg in the mobile network and a traffic channel leg in the fixed telecommunication network. If the fixed network traffic channel leg utilizes a higher data rate (R2) than the mobile network transparent traffic channel leg (R1), the interworking function (IWF) buffers data in a data buffer (31) and uses flow control towards the fixed network. This enables the mobile network to support towards the fixed network a nominal user rate that is higher than the highest nominal user rate in the mobile network.

20 Claims, 4 Drawing Sheets

METHOD AND APPARATUS FOR ENABLING DATA TRANSMISSION BETWEEN A MOBILE NETWORK AND A FIXED NETWORK HAVING DIFFERENT DATA RATES

FIELD OF THE INVENTION

The invention relates to mobile communications systems and particularly to transparent data calls employing different rates and bearer services.

BACKGROUND OF THE INVENTION

In addition to the conventional speech transmission, modern mobile systems also provide subscribers with different data transmission properties. Mobile system services can be classified generally into teleservices and bearer services. A bearer service is a telecommunication service that provides the transmission of signals between user-network interfaces. For example modem services constitute bearer services. In a teleservice the network also provides services for the terminal equipment. Important teleservices in turn include speech, facsimile and videotex services.

The bearer services are usually classified into groups according to their characterizing features, e.g. asynchronous and synchronous bearer services. In an asynchronous bearer service, the transmitting and the receiving data terminal maintain their synchronization only for the transmission of each individual character. In a synchronous bearer service, the transmitting and the receiving data terminal are synchronized with each other during the entire data transmission. Within each such group there are a number of bearer services, such as a transparent service and a non-transparent service. In a transparent service, the data to be transmitted is non-structured, and transmission errors are only corrected by means of channel coding. In a non-transparent service, the data to be transmitted is structured into service data units, and transmission errors are corrected by using (in addition to channel coding) automatic retransmission requests. Further, each user data rate constitutes at present an individual bearer service. Therefore the number of different bearer services is great. For example in the Pan-European digital mobile system GSM (Global System for Mobile Communication), the data services for a single traffic channel presently comprise six different asynchronous bearer services for the rates of 300, 1200, 1200/75, 2400, 4800 and 9600 bit/s.

The present transparent services in the GSM system are based on a uniform end-to-end traffic channel, i.e. the data rate over each leg of the traffic channel and at the terminal interfaces is the same. According to this requirement, the GSM bearer services and the bearer services of the fixed network, such as the ISDN, must employ the same data rate. For example, if a transparent digital data call (e.g. UDI= unrestricted digital information) is set up between the GSM network and the ISDN, the user rate must be the same, e.g. 9600 bit/s, in both networks or the call fails.

Typically, the same mobile subscriber may have access to different teleservices and bearer services. He may use, for example, a speech service, a facsimile service and data services utilizing different types of bearer services. A call terminating at or originating from a mobile station may therefore require any one of these teleservices and bearer services, or a combination thereof, wherefore the correct service must be indicated to the mobile network. In calls originating from the mobile station, the call set-up signalling contains service data on the basis of which the mobile network is able to select the correct service. Also in calls originating from the ISDN (Integrated Services Digital Network), the signalling contains corresponding service data. If the call originates from, or is routed via, the public switched telephone network PSTN, however, no service data arrives at the mobile network. The solution to this problem is a multi-numbering scheme wherein a mobile subscriber has as many directory numbers as he has different services to which he wants to receive incoming calls.

The problem with the multinumbering scheme is the large number of bearer services. In order to alleviate this problem, the Applicant's co-pending PCT application PCT/FI96/00506 discloses so-called general bearer services: e.g. one asynchronous bearer service, one synchronous bearer service, one PAD Access bearer service and one Packet Access bearer service. This is achieved by providing the interworking between the mobile network and the fixed network with the following operations: negotiating a data rate between a mobile station and a mobile services switching centre, monitoring the data rate in the traffic channel leg between the mobile services switching centre and the fixed network, modifying the traffic channel mode of the mobile network, and decreasing the number of subchannels in high-rate HSCSD (high speed circuit switched data) services utilizing a multislot technique.

More precisely, in this procedure a mobile station MS and an interworking function IWF of the mobile services switching centre MSC first agree on a mutual maximum data rate to be used. The MSC IWF thereafter checks which data rate the fixed network traffic channel uses.

If the data rate in the fixed network is lower than the data rate negotiated by the MS and the IWF, the extra radio channel capacity is released and (in a transparent case) the mobile network traffic channel is modified to use the most efficient channel coding available in this case. In such a way, the data rate of the fixed network is adapted to the traffic channel rate of the mobile network by using the rate adaptation procedures of the mobile network so that a constant end-to-end data rate is ensured.

If the data rate in the fixed network is higher than the data rate negotiated by the MS and the IWF, flow control and buffering ensure that no data is lost in a non-transparent call. Transparent bearer services are not assumed to be supported in this case, since the traffic channel cannot support a constant end-to-end data rate. A terminal equipment in the fixed network transmits data to a fixed network traffic channel at a rate that is higher than the rate over the transparent traffic channel leg of the mobile network, and loss of data in the IWF is inevitable. In the other direction, the MS transmits data in a transparent traffic channel at a rate that is lower than the data rate over the traffic channel leg of the fixed network, and data integrity is lost in the IWF. For this reason, a call is released already during the call set-up if it is detected that the data rate over the fixed network leg is higher than the maximum data rate negotiated by the MS and the MSC for the transparent traffic channel. In other words, the mobile network does not support the use of transparent bearer services in such a situation.

The problem is that at present the ISDN does not usually provide, in practice, any kind of end-to-end signalling support that would carry parameters specific to the data call. In this situation, a calling ISDN terminal equipment can only use the default values of the parameters, which presently signifies probably the data rate of 19.2 kbit/s (and probably 38.4 kbit/s in future). On the other hand, for example the GSM network only supports the data rate of 9.6 kbit/s. This means that a transparent call is rejected after the IWF has detected the data rate employed over the fixed network traffic channel leg. If the IWF does not monitor the fixed network traffic channel, the call will be released in any case by the application or by the subscriber at either end since the transmission of data will fail.

If end-to-end signalling support is available and the calling ISDN terminal equipment signals a data rate (e.g. 19.2 kbit/s) that is higher than the data rate supported by the mobile network (e.g. 9.6 kbit/s), the call is released if it is transparent as a result of the negotiation between the MS and the MSC.

BRIEF SUMMARY OF THE INVENTION

An object of the invention is to enable, in mobile networks, transparent data calls where the fixed network traffic channel leg utilizes a higher data rate than the mobile network traffic channel leg is able to support.

This is achieved with a data transmission method in a digital mobile network, the method comprising the step of setting up an end-to-end data connection in a fixed telecommunication network between a mobile station and another party, the connection comprising a transparent traffic channel leg in a mobile network, a traffic channel leg in the fixed telecommunication network, and an interworking function between the transparent traffic channel leg and the fixed network traffic channel leg. The method is characterized according to the invention by

- setting a data rate for the transparent traffic channel leg in the mobile network,
- detecting the data rate of the fixed network traffic channel leg in the interworking function,
- determining that the detected data rate of the fixed network traffic channel leg is higher than said set data rate in the transparent traffic channel leg in the mobile network,
- buffering, in the interworking function, data received at said higher rate from the fixed network traffic channel leg,
- transmitting buffered data from the interworking function to the transparent traffic channel leg of the mobile network at said set data rate,
- adjusting the data buffering in the interworking function by using data flow control towards the fixed network,
- applying protocol-sensitive rate adaptation in the interworking function on data transmitted from the transparent traffic channel leg to the fixed network traffic channel leg.

The invention also relates to an interworking function for a digital mobile system, the interworking function being intended to be connected, in an end-to-end data connection, between a transparent traffic channel leg in the mobile network and a traffic channel leg in the fixed telecommunication network. The interworking function is characterized according to the invention in that the interworking function is arranged to detect the data rate of the fixed network traffic channel leg, the interworking function is responsive to the detected data rate of the fixed network traffic channel leg that is higher than the data rate of the transparent traffic channel leg, for buffering data received at said higher rate from the fixed network traffic channel leg, and for transmitting the buffered data from the interworking function to the transparent traffic channel leg of the mobile network at said data rate of the transparent traffic channel leg, the interworking function is arranged to adjust the data buffering by using data flow control towards the fixed network, the interworking function comprises protocol-sensitive rate adaptation on data transmitted from the transparent traffic channel leg to the fixed network traffic channel leg.

In the present invention, the mobile network does not, as in the prior art, release a transparent data call when the data rate is higher in the fixed network traffic channel leg than the data rate in the transparent mobile network traffic channel leg. Instead, the mobile network employs, towards the fixed network, flow control in order to prevent overflow and loss of data in the data buffer that is located in an IWF at the interface between the mobile network traffic channel leg and the fixed network traffic channel leg. The activation of the flow control is based on the amount of the buffered data, for example, by means of monitoring the filling level of the data buffer. When the flow control is off (deactivated), the fixed network transmits at full rate towards the mobile network, the mobile network buffers the data in the data buffer, and the buffer forwards the data to the transparent mobile network traffic channel leg at a lower rate. In such a way, the data buffer gradually fills up to a first threshold value, which activates the flow control. When the flow control is on (activated), the mobile network does not receive data from the fixed network to the data buffer, but the data buffer transmits data from the data buffer to the transparent mobile network traffic channel leg. In such a way, the data buffer gradually empties to a second threshold value, which again deactivates the flow control.

In the present invention, an ideal end-to-end transparent traffic channel is divided into two legs with different data rates, which is contrary to what is disclosed in the current GSM recommendations, for example. The data buffering and flow control according to the invention ensure, however, that in practice the transparent traffic channel leg of the mobile network has a fixed data rate, and the traffic channel leg can be embodied in accordance with the recommendations. Also, the average data rate in the fixed network leg is equal to the fixed data rate in the mobile network leg, even though the nominal data rate in the fixed network is higher. In this manner, the invention enables the support of the present transparent services in the mobile networks also for data calls wherein the fixed network uses a higher data rate than allowed in the mobile network. The flow control required in the fixed networks already exists in the V.110 and V.120 protocols, for example. The invention only requires the activation of buffering and flow control to be implemented in the transparent services in the mobile network. The implementation of the flow control may be similar to that already used in non-transparent services. Unlike in a non-transparent case, the invention does not utilize retransmitting protocols, for example a radio link protocol, in either network.

In the other transmission direction, i.e. from the mobile network to the fixed network, the mobile network applies protocol-sensitive rate adaptation in order to maintain the data integrity and to appropriately occupy the higher transmission capacity in the higher rate fixed network leg. In case of an asynchronous bearer service, this may mean that the gaps between the characters are filled with additional stop bits. In case of a synchronous bearer service, this may mean that the gaps between L2 (layer 2) protocol frames are filled with protocol-specific filler. For example the filler between HDLC (high level data link control) frames may consist of HDLC flags.

BRIEF DESCRIPTION OF THE DRAWINGS

The invention will be described below by means of preferred embodiments with reference to the accompanying drawings, in which.

PREFERRED EMBODIMENTS OF THE INVENTION

The present invention can be employed in all digital mobile systems supporting several data services of different types and different rates.

The present invention is particularly suitable for data transmission applications in the Pan-European digital mobile system GSM (Global System for Mobile Communications) and in other GSM-based systems, such as DSC1800 (Digital Communication System) and the U.S. digital cellular system PCS (Personal Communication System). The invention will be described below by using the GSM mobile system as an example. The structure and operation of the GSM system are well known to a person skilled in the art and they are defined in the GSM specifications of the ETSI (European Telecommunications Standards Institute). Reference is also made to *GSM System for Mobile Communication* by M. Mouly and M. Pautet (Palaiseau, France, 1992; ISBN:2-9507190-0-7).

Figure 1:
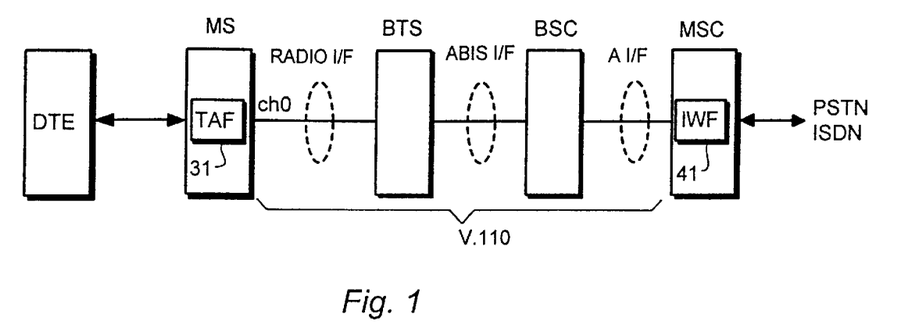
FIG. 1 illustrates a part of a mobile system where the present invention can be applied.

The basic structure of the GSM system is shown in FIG. 1. The GSM structure consists of two parts: a base station system BSS and a network subsystem NSS. The BSS and the MSs communicate via radio connections. In the BSS, each cell is served by a base station BTS. A number of BTSs are connected to a base station controller BSC the function of which is to control radio frequencies and channels used by the BTS. The BSCs are connected to an MSC. Certain MSCs are connected to other telecommunication networks, such as the public switched telephone network PSTN, and they comprise gateway functions for calls terminating at and originating from these networks. These MSCs are known as gateway-MSCs (GMSC).

There are two main types of databases that are related to call routing. The first one is a home location register HLR that stores the subscriber data of all network subscribers permanently or semipermanently, including information about the services to which the subscriber may have access and about the current location of the subscriber. The other type of register is a visitor location register VLR. The VLR is usually connected to one MSC, but it may also serve several MSCs, however. The VLR is often integrated to the MSC. This integrated network element is known as a visitor-MSC (VMSC). Whenever an MS is active (registered and able to make or receive calls), most of the mobile subscriber data concerning the MS and maintained in the HLR is copied to the VLR of the MSC in the area of which the MS is located.

Also with reference to FIG. 1, in the GSM system a data connection is established between a terminal adaptation function TAF 31 of an MS and an IWF 41 in the mobile network. In data transmission occurring in the GSM network, the connection is a V.110 rate-adapted, UDI-coded digital full-duplex connection that is adapted to V.24 interfaces. The V.110 connection described herein is a digital transmission channel that was originally developed for ISDN (Integrated Services Digital Network) technology, that is adapted to the V.24 interface, and that also provides the possibility of transmitting V.24 statuses (control signals). The CCITT recommendation for a V.110 rate-adapted connection is disclosed in the CCITT Blue Book: V.110. The CCITT recommendation for a V.24 interface is disclosed in the CCITT Blue Book: V.24. The TAF adapts a data terminal DT connected to the MS to the aforementioned V.110 data connection which is established over a physical connection utilizing one or several traffic channels. The IWF connects the V.110 data connection to another V.110 network, such as the ISDN or another GSM network, or to any other transit network, such as the PSTN.

As described above, modern mobile systems support different teleservices and bearer services. The GSM bearer services are defined in the GSM specification 02.02, version 4.2.0 and the teleservices in the GSM specification 02.03, version 4.3.0.

Figure 2:
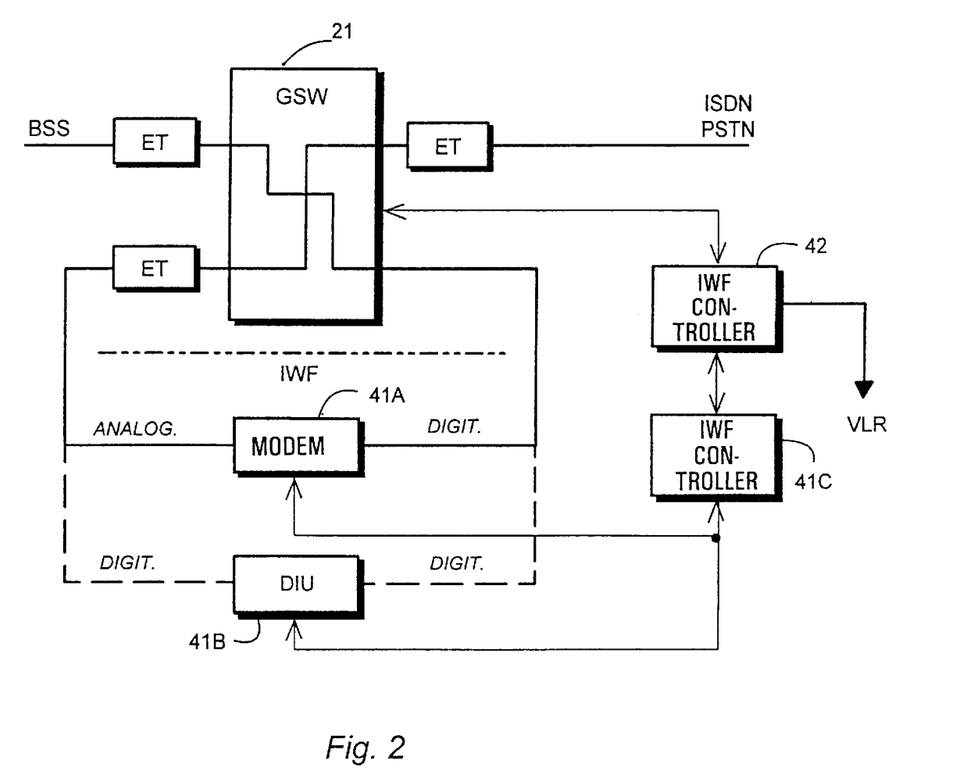
FIG. 2 is a block diagram of a mobile services switching centre that is provided with an interworking function IWF.

The IWF is often placed in the MSC. FIG. 2 shows an IWF placed in the MSC and performing adaptation to the data services of the PSTN and the ISDN. For the adaptation to the PSTN, to an ISDN audio service of 3.1 khz, or to another GSM mobile network, the IWF comprises a number of baseband data modems 41A which also comprise a rate adapter. The modems 41A are autobauding modems that are able to accept, as a result of handshaking, any data rate supported by the GSM system between 300 and 9600 bit/s, and even higher rates, e.g. 14.4. to 28.8 kbit/s, for HSCSD data services. There may be any required number of data modems, even though FIG. 2 shows only one modem 41A for the sake of clarity. The analog side of the modem 41A is connected via an exchange termination ET and the digital side is connected directly to a group switch GSW21 of the MSC. Digital transmission links to the BSSs are also connected to the group switch 21 via the ETs. Further, transmission channels of other telecommunication networks, such as the ISDN or the PSTN, are also connected to the group switch 21 via the ETs. The IWF shown in FIG. 2 also comprises a data interface unit DIU 41B, containing a rate adapter, for the purpose of adaptation to the unrestricted digital information service UDI or to the restricted digital information service RDI of the ISDN. The DIU is used in the GSM data calls to adapt to the GSM traffic channel the user data that arrives from the ISDN and that is rate-adapted according to the V.110 (or V.120) recommendation, and the status and control information according to the V.110 (or V.120) recommendation, and vice versa to adapt the user data and status and control information from the GSM traffic channel to a V.110 (or V.120) frame structure of the ISDN. The ISDN side of the DIU 41B is connected via an ET and the GSM side is connected directly to the group switch GSW21. Even though FIG. 2 shows only one DIU 41B, the number of these units may be selected freely depending on the need for capacity. The group switch GSW21 and the IWF, as well as the set-up, maintenance and release of data calls, are controlled by call control 42. The operation of the IWF is controlled by an IWF controller 41C which connects, under the call control 42, the IWF, modem 41A or DIU 41B needed by the bearer service used by each data call to the data connection. FIG. 2 illustrates with a solid line the on-line connection of the modem 41A and with a broken line the on-line connection of the DIU 41B. An example of an MSC comprising such an IWF is the DX200 MSC manufactured by Nokia Telecommunications Oy, Finland.

As stated above, in the multinumbering scheme a mobile subscriber may have several directory numbers for different teleservices and bearer services. The Applicant's co-pending PCT application PCT/FI96/00506 (unpublished on the filing date of the present application) discloses an arrangement which determines a small number of general bearer service classes, and the subscriber has access to all the data rates supported by the GSM network within these classes. The determination of the bearer services in the subscriber data may therefore be for example as follows: asynchronous services, synchronous services, PAD access and Packet access.

This is possible by means of a three-phase call-set-up procedure. In the first phase, the data transmission rate is negotiated between the MS and the GSM network, in the second phase the data transmission rate to be used between the GSM network and the fixed network, such as the PSTN or the ISDN, is negotiated or identified, and in the third phase the channel type and/or channel coding to be used over the radio path is adapted, if required, to the final data rate used by the call. In the HSCSD service, also the required number of radio channels is adapted. This procedure is described in detail in the aforementioned patent application, which is incorporated herein by reference.

In the call set-up according to the aforementioned patent application, a transparent call is released, however, if the data rate used between the GSM and the ISDN/PSTN is higher than the data rate between the MS and the IWF. In the present invention, a transparent call is also set up in such a situation.

In the following, the call set-up according to the invention will be described in case of a mobile-originating (MO) and a mobile-terminating (MT) transparent call with reference to FIGS. 3 and 4, respectively.

MO Call

Figure 3:
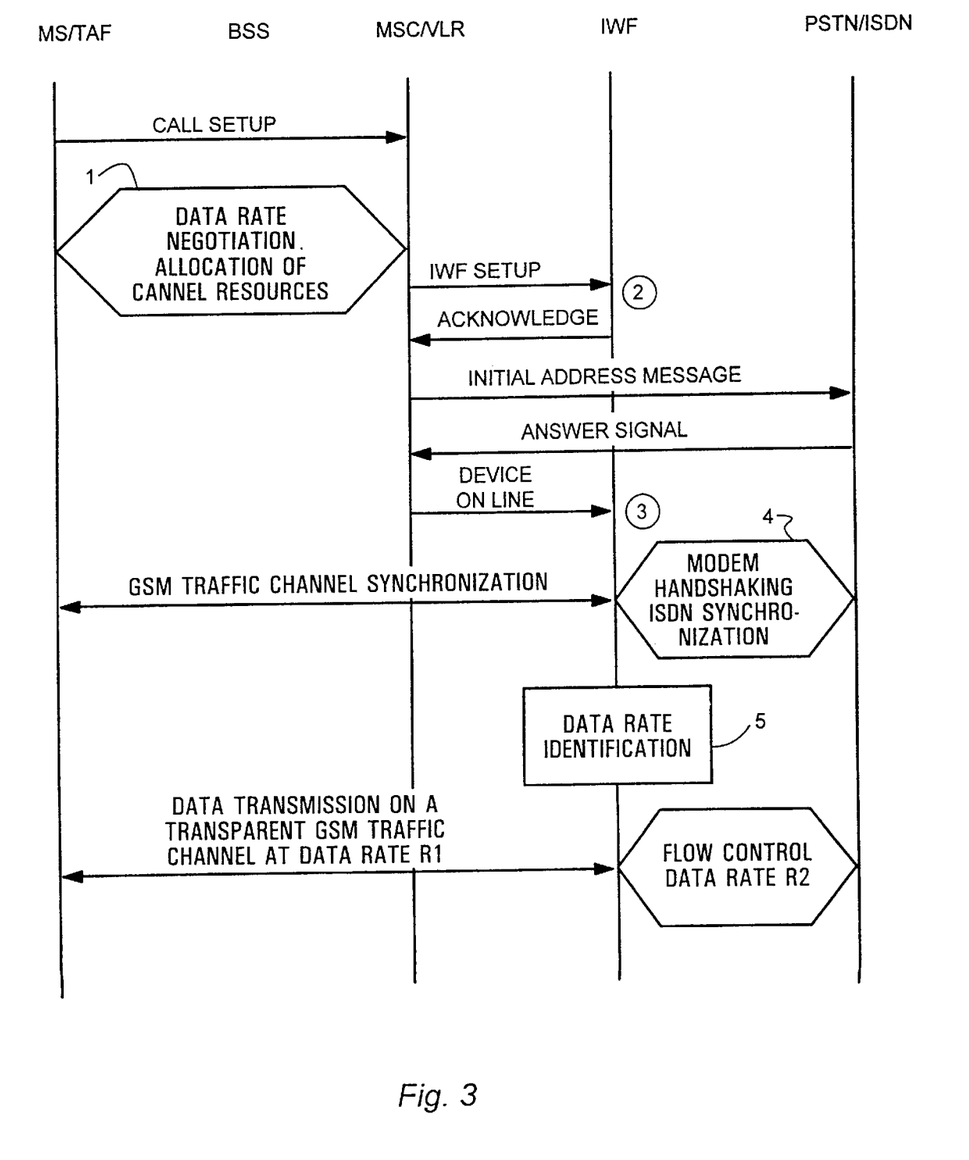
FIG. 3 is a signalling diagram illustrating a call originating from a mobile station.
Figure 4:
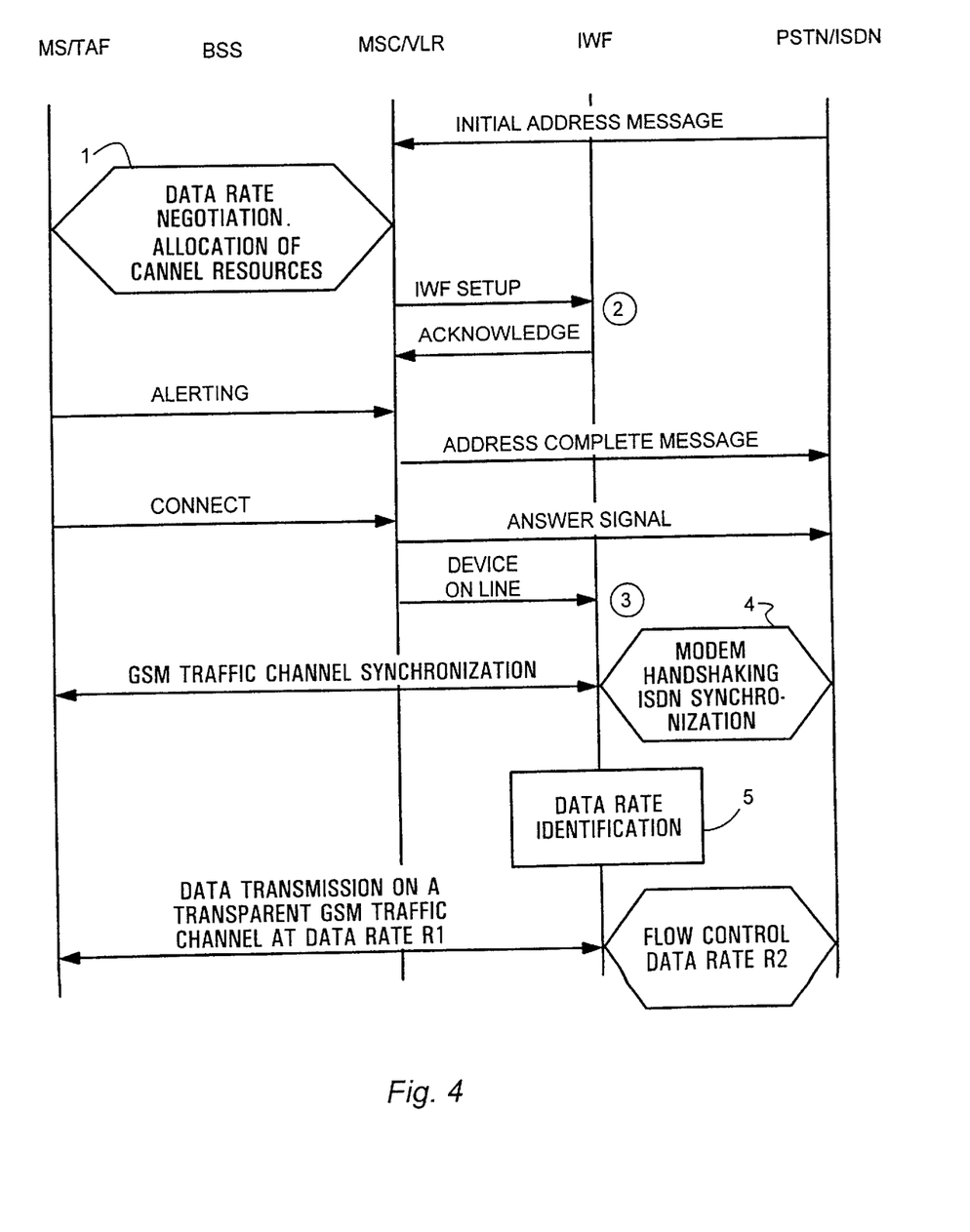
FIG. 4 is a signalling diagram illustrating a call terminating at a mobile station.

With reference to FIG. 3, in an MO call an MS initiates the call set-up by transmitting to the MSC a CALL SETUP message containing BCIE parameters that indicate the desired service and user rate. In the example, the MS requests for a transparent UDI or RDI call.

After the MSC/VLR has received the CALL SETUP message, it performs a compatibility and a subscription check and negotiates with the MS a data rate for the call and allocates the required traffic channel resources over the radio path (step 1), as described in PCT/FI96/00506. If the MS accepts the data rate, it configures itself for this data rate and tunes to the allocated channel.

The MSC thereafter reserves the required resources of the IWF by transmitting an IWF SETUP message. The IWF acknowledges the operation with an ACKNOWLEDGEMENT message. In the MSC of FIG. 2, the allocation of IWF resources according to FIG. 3 (step 2) means that the call control 42 orders the IWF controller 41C to allocate the DIU 41B for a UDI or an RDI call.

The MSC thereafter activates connection set-up to the called subscriber to the PSTN or the ISDN with an INITIAL ADDRESS message. The called PSTN subscriber connects its own terminal equipment to the line and answers with an ANSWER SIGNAL message. The MSC guides the DIU 41B of the IWF to the line with a DEVICE ON LINE message (step 3). In the MSC of FIG. 2, this means that the call control 42 connects the DIU 41B with the group switch GSW 21 between the transmission line from the BSS and the transmission line to the PSTN or the ISDN, as shown in FIG. 2. The synchronization of the GSM traffic channel thereafter takes place between the TAF and the IWF.

In case of a UDI or an RDI call, the synchronization of the ISDN traffic channel takes place between the IWF and the ISDN terminal equipment (step 4). The rate detection of the ISDN traffic channel according to the invention is thereafter performed in step 5. If the signalling used is ISDN signalling carrying a BCIE indicating the user rate, no other rate detection is needed. The only feature essential to the invention is that the data rate used in a UDI or an RDI call is detected. When the DIU 41B of the IWF has detected the data rate of the ISDN traffic channel, it informs the IWF controller 41C of the data rate.

If the data rate that was agreed on during handshaking or that has been detected is sufficient, i.e. equal to the data rate negotiated by the MS and the MSC, the IWF controller 41C commands the modem 41A to signal to the MS with the V.24 statuses (CT106, CT109) of the traffic channel that the traffic channel is ready for data transmission (step 9). The process then proceeds to the step of data transmission wherein the GSM traffic channel leg and the PSTN/ISDN traffic channel leg provide an end-to-end traffic channel that has a uniform data rate. The present invention is not related to this situation.

If the data rate that was agreed on during handshaking or that has been detected is too low compared to the channel resources allocated to the radio path according to the data rate negotiated by the MS and the MSC, the channel type, channel coding and/or channel number to be used over the radio path are adapted to the final data rate, as described in PCT/FI96/00506. However, the present invention is not related to this situation, either.

The present invention relates to a situation wherein the agreed or detected data rate is higher than the data rate negotiated by the MS and the MSC. In such a case, the IWF controller 41C instructs the DIU 41B to buffer the data arriving from the ISDN/PSTN traffic channel at a greater rate R2, to forward the data to the transparent GSM traffic channel at a lower rate R1 and to adjust the filling level of the data buffer by using flow control in the direction of the PSTN/ISDN terminal equipment. Also, the IWF controller commands the DIU 41B to use protocol-sensitive rate adaptation in the other transmission direction.

A Mobile-Terminating (MT) Call

A mobile-terminating UDI or RDI call will be described below with reference to FIG. 4. After the conventional routing data request described in PCT/FI96/00506, the gateway-MSC routes to the MSC a data call from the PSTN in an INITIAL ADDRESS MESSAGE containing a mobile station roaming number MSRN. As a result, (transparent) negotiation for the data rate and the call type, and the allocation of the required traffic channel resources are carried out, as described in PCT/FI96/00506.

The MSC thereafter allocates the required IWF resources with an IWF SETUP message and the IWF acknowledges the allocation with an ACKNOWLEDGE message. This is entirely identical with the allocation of IWF resources carried out in FIG. 3. The MS indicates with an ALERTING message that the alerting of the called user has been started. The MSC in turn informs the calling subscriber in the PSTN/ISDN network with an ADDRESS COMPLETE message that the connection has been set up. The MS then transmits a CONNECT message, which indicates that the called subscriber accepts the call, whereafter the MSC transmits an ANSWER SIGNAL message to the calling PSTN/ISDN subscriber. Rate adaptation is thereafter connected to the line and the call set-up is continued as shown in FIG. 3.

Flow Control and Protocol-Sensitive Rate Adaptation

Figure 5:
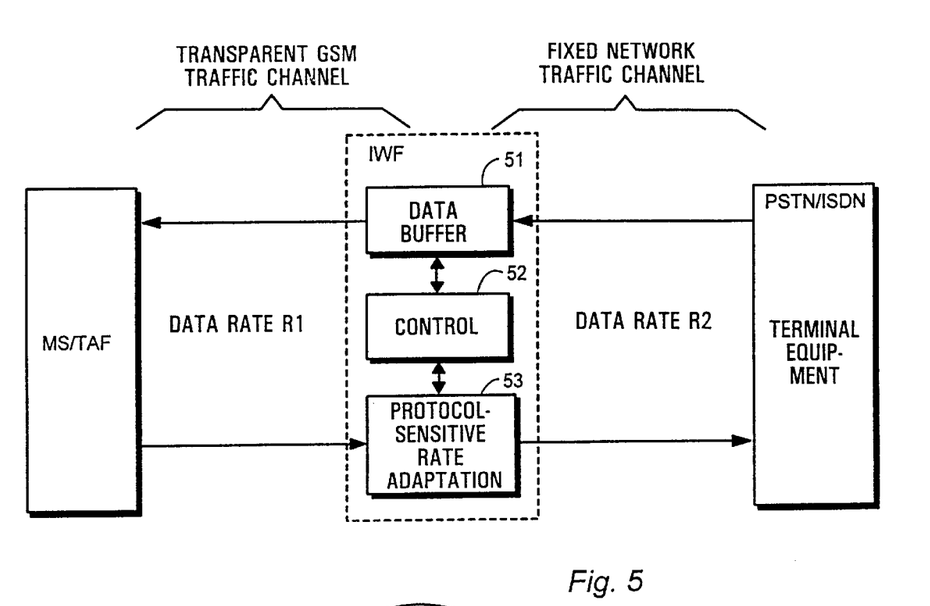
FIG. 5 is a functional block diagram illustrating an IWF and an end-to-end connection according to the invention.
Figure 6:
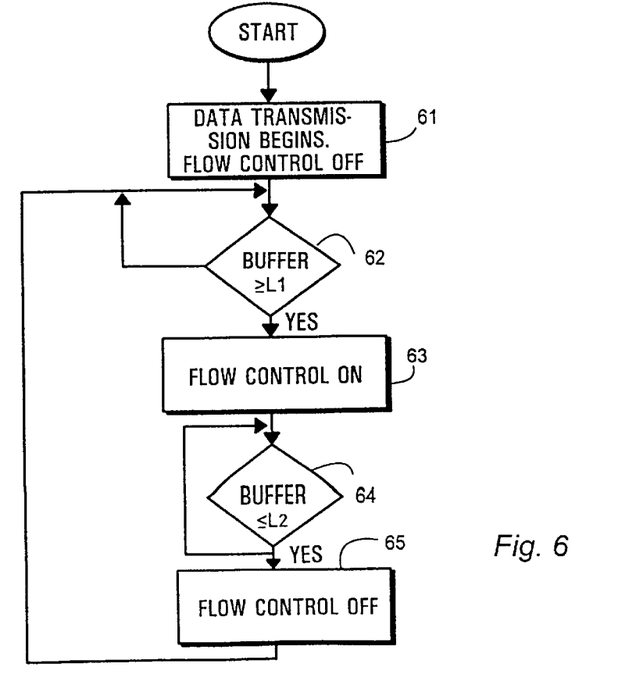
FIG. 6 is a flow diagram illustrating the flow control according to the invention.

In the following, the flow control and protocol adaptation according to the invention will be described in greater detail with reference to FIGS. 5 and 6. FIG. 5 illustrates an end-to-end connection according to the invention, consisting of a transparent GSM traffic channel leg between the MS/TAF and the IWF and of a fixed network traffic channel leg between the IWF and the ISDN/PSTN terminal equipment. In FIG. 5, the IWF comprises as functional blocks a data buffer 51, data buffer control 52 and protocol-sensitive rate adaptation 53. The control unit 52 monitors the amount of the data buffered in the data buffer 51, i.e. for example the filling level of the buffer, and it uses flow control in the direction of the fixed network terminal equipment in order to avoid overflow and loss of data in the data buffer 51. The operation of the control unit 52 is illustrated by the flow diagram of FIG. 6. Assume that data transmission has just started and the flow control is deactivated in step 61. The PSTN/ISDN terminal equipment transmits data to the IWF at the full rate R2, the IWF buffers the data in the data buffer 51 that forwards the data via a GSM traffic channel to the MS/TAF at the lower data rate R1. In such a way, the data buffer 51 slowly fills up. In step 62, it is checked whether the buffer 51 has filled up to the threshold value L1. If it has not, the process will be in a waiting mode. When the buffer 51 has filled up to the threshold value L1 in step 62, the control unit 52 activates the flow control according to the protocol used by the fixed network (step 63), as will be described in greater detail below. When the flow control is active, the PSTN/ISDN terminal equipment does not transmit data. In such a case, the IWF does not receive data from the fixed network to the data buffer 51, but it transmits data from the data buffer 51 to the transparent traffic channel of the mobile network at the rate R1. The data buffer 51 thus gradually empties. When the buffer 51 has emptied to the threshold value L2 in step 64, the control unit 52 again deactivates the flow control according to the protocol used by the fixed network.

Typical fixed network protocols include ITU-T V.110 and V.120.

V.110 is defined in the ITU-T V.110 recommendation, the flow control especially in item 2.4. The flow control is on when the IWF transmits to the fixed network a V.24 status CT106=off (ready for sending=off), and it is off when the IWF transmits to the fixed network a V.24 status CT106=off (ready for sending=off). In FIG. 5, the control unit 52 instructs the rate adaptation unit 53 to set the CT106 status in the outgoing V.110 frames. Alternatively, the flow control may employ a V.110 XON/XOFF operation.

V.120 is defined in the ITU-T V.120 recommendation. V.120 is an HDLC-type frame-based protocol that supports both unacknowledged and multiframe services that are defined in the ITU-T recommendation Q.922. In the present invention, the IWF is arranged to prevent the multiframe mode. Only the Unacknowledgement mode is allowed. This ensures a fixed data rate with no unpredictable delays. The flow control is described especially in items 3.1.2 and 3.2.4 of the V.120 recommendation. For example in the asynchronous V.120 unacknowledged mode, the flow is controlled with an RR (receiver ready) bit of the frame control state octet. In FIG. 5, the control unit 52 commands the rate adaptation unit 53 to set the RR bit of the control state octet in the outgoing V.120 frame either to zero or one, depending on whether the flow control is to be on or off. In a synchronous case, the flow control is on for example when the IWF transmits to the fixed network RNR (receiver not ready) frames, and it is off when the IWF transmits to the fixed network RR (receiver ready) frames. In FIG. 5, the control unit 52 instructs the rate adaptation unit 53 to set the outgoing frame either as an RNR or an RR frame depending on whether the flow control is to be on or off.

It should be noted that the IWF also carries out the normal rate adaptation functions according to the GSM recommendations between the V.110 and V.120 frames arriving from the fixed network and the GSM V.110 frames.

In the other transmission direction, the MS/TAF transmits data to the IWF via a transparent GSM traffic channel at the data rate R1. The IWF forwards the data at the higher rate R2. The IWF applies the protocol-sensitive rate adaptation 53 on the outgoing data in order to maintain the data integrity and to fill appropriately the higher transmission capacity over the high rate fixed network leg.

In case of an asynchronous bearer service and the V.110 protocol, this means that the gaps between the characters are filled with additional stop bits according to the V.110 recommendation. In a synchronous bearer service, the filling is performed according to the end-to-end protocol used. For example in case of HDLC, the filling is carried out with HDLC flags according to the ITU-T X.25 recommendations.

In case of the V.120 protocol, the rate adaptation means that the gaps between the frames are filled with HDLC flags according to the V.120 recommendation.

It should be noted that the IWF also carries out the normal rate adaptation functions according to the GSM recommendations from the GSM traffic channel between the GSM V.110 frames and the V.110 or V.120 frames transmitted to the fixed network.

It should also be noted that in the invention the GSM traffic channel leg may consist of one traffic channel (single slot access) in conventional data services and of two or more parallel traffic channels (multislot access) in the HSCSD services.

The figures and the description related thereto are only intended to illustrate the present invention. The details of the invention may vary within the scope of the appended claims.

What is claimed is:

1. A data transmission method in a digital mobile network, the method comprising the step of setting up an end-to-end data connection in a fixed telecommunication network between a mobile station and another party, the connection comprising a transparent traffic channel leg in a mobile network, a traffic channel leg in the fixed telecommunication network, and an interworking function between the transparent traffic channel leg and the fixed network traffic channel leg, setting a data rate for the transparent traffic channel leg in the mobile network, detecting the data rate of the fixed network traffic channel leg in the interworking function, determining that the detected data rate of the fixed network traffic channel leg is higher than said set data rate in the transparent traffic channel leg in the mobile network, buffering, in the interworking function, data received at said higher rate from the fixed network traffic channel leg, transmitting buffered data from the interworking function to the transparent traffic channel leg of the mobile network at said set data rate, adjusting the data buffering in the interworking function by using data flow control towards the fixed network, and applying protocol-sensitive rate adaptation in the interworking function on data transmitted from the transparent traffic channel leg to the fixed network traffic channel leg.

2. A method according to claim 1, wherein said step of setting the data rate comprises the step of
performing a data rate negotiation between the mobile network and the mobile station during the set-up of a data call, in order to set the data rate for the data transmission between the mobile station and the mobile network.

3. A method according to claim 1 wherein said step of detecting the data rate comprises the step of
detecting the data rate from the signalling transmitted by the fixed network.

4. A method according to claim 1 wherein said step of detecting the data rate comprises the step of
detecting the data rate by monitoring the fixed network traffic channel leg.

5. A method according to claim 1 wherein said step of adapting the rate comprises the step of
adding filler to the data received from the transparent traffic channel leg in such a way that the total amount of data corresponds to the higher data rate of the fixed network traffic channel leg.

6. A method according to claim 1 further comprising a step of
using flow control according to the ITU-T V.110 or V.120 protocol.

7. A method according to claim 5 further comprising a step of
adding additional stop bits between the asynchronous characters received from the transparent traffic channel leg.

8. A method according to claim 5, further comprising a step of adding HDLC flags between the HDLC frames received from the transparent traffic channel leg.

9. An interworking function for a digital mobile system, the interworking function being intended to be connected, in an end-to-end data connection, between a transparent traffic channel leg in the mobile network and a traffic channel leg in the fixed telecommunication network, wherein
the interworking function is arranged to detect the data rate of the fixed network traffic channel leg,
the interworking function being responsive to the detected data rate of the fixed network traffic channel leg that is higher than the data rate of the transparent traffic channel leg, for buffering data received at said higher rate from the fixed network traffic channel leg, and for transmitting the buffered data from the interworking function to the transparent traffic channel leg of the mobile network at said data rate of the transparent traffic channel leg,
the interworking function being arranged to adjust the data buffering by using data flow control towards the fixed network, and wherein the interworking function comprises protocol-sensitive rate adaptation on data transmitted from the transparent traffic channel leg to the fixed network traffic channel leg.

10. A method according to claim 2, wherein said step of detecting the data rate comprises the step of
detecting the data rate from the signalling transmitted by the fixed network.

11. A method according to claim 2, wherein said step of detecting the data rate comprises the step of
detecting the data rate by monitoring the fixed network traffic channel leg.

12. A method according to claim 2, wherein said step of adapting the rate comprises the step of
adding filler to the data received from the transparent traffic channel leg in such a way that the total mount of data corresponds to the higher data rate of the fixed network traffic channel leg.

13. A method according to claim 3, wherein said step of adapting the rate comprises the step of
adding filler to the data received from the transparent traffic channel leg in such a way that the total amount of data corresponds to the higher data rate of the fixed network traffic channel leg.

14. A method according to claim 4, wherein said step of adapting the rate comprises the step of
adding filler to the data received from the transparent traffic channel leg in such a way that the total mount of data corresponds to the higher data rate of the fixed network traffic channel leg.

15. A method according to claims 2, further comprising a step of using flow control according to the ITU-T V.110 or V.120-protocol.

16. A method according to claims 3, further comprising a step of
using flow control according to the ITU-T V.110 or V.120-protocol.

17. A method according to claims 4, further comprising a step of
using flow control according to the ITU-T V.110 or V.120-protocol.

18. A method according to claims 5, further comprising a step of
using flow control according to the ITU-T V.110 or V.120-protocol.

19. A method according to claim 6, further comprising a step of adding additional stop bits between the asynchronous characters received from the transparent traffic channel leg.

20. A method according to claim 6, further comprising a step of
adding HDLC flags between the HDLC frames received from the transparent traffic channel leg.

* * * * *